Patented Dec. 7, 1937

2,101,524

UNITED STATES PATENT OFFICE 2,101,524

QUATERNARY AMMONIUM COMPOUNDS AND PROCESS OF PREPARING THEM

Gerhard Balle and Kurt Eisfeld, Frankfort-on-the-Main, Germany, assignors to General Aniline Works, Inc., New York, N. Y., a corporation of Delaware No Drawing. Application June 18, 1937, Serial No. 149,028. In Germany June 24, 1931

23 Claims. (Cl. 260—106)

The present invention relates to quaternary ammonium compounds and to a process of preparing them.

This application is a continuation-in-part of our co-pending U. S. patent application Serial No. 39,993, filed September 10, 1935 for "Quaternary ammonium compounds and a process of preparing them".

We have found that valuable quaternary ammonium compounds may be prepared by causing esters of such carboxylic acids as contain a reactive halogen atom or another reactive anion to react with tertiary organic bases. The ester-like products thus obtained may be saponified or may be transformed into amide-like products by means of ammonia or primary or secondary amines or derivatives thereof. The new products correspond to the general formula:

wherein the group X≡N means a tertiary base,
Y stands for an anion, such as, for instance, halogen or the hydroxyl group,
R means a hydrocarbon radical and
Z stands for a carboxyl group which may be esterified or may be amidated.

Thus there may be formed, for instance, by the action of chloroacetic acid methyl ester upon tributylamine the chloride of the tributylbetain-methyl-ester of the formula:

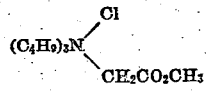

As tertiary bases there may be used, for instance: trimethylamine, tributylamine, butyldiethanolamine, amyldipropanolamine, triethanolamine, tripolyethanolamine, methyl - bis - (dihydroxypropyl) -amine, tetramethylethylenediamine, tetraoxethylethylenediamine, tertiary polyethylenepolyamines, pyridine, hexamethylenetetramine, cyclohexyldimethylamine, dimethylaniline, diethanolaniline, dimethylglucamine, hexadecylmethylglucamine, dodecyldimethylamine, oleyldiethanolamine, stearylpolyethanolamine; furthermore the amines which have been alkylated or hydroxyalkylated or polyhydroxyalkylated to the tertiary stage and which may be prepared from the acids contained in natural fats, oils or waxes, according to one of the known methods, for instance, by reducing the corresponding acid amides or acid nitriles.

For the reaction of these amines there may be used, for instance, all carboxylic acid esters which contain a reactive halogen atom such as, for instance, the esters of chloroacetic acid, alpha-chloropropionic acid, beta-chloropropionic acid, alpha-bromobutyric acid, alpha-bromolauric acid or the like esterified with an aliphatic, aromatic or hydroaromatic alcohol as well as with a phenol; furthermore, for instance, the sulfuric acid esters of hydroxycarboxylic acid-esters such as the sulfuric acid ester of castor-oil-butyl-ester or the like.

The compounds of the above formula may be prepared by warming the amine with one of the aforesaid or an analogous ester (to about 70° C. to about 100° C.). By using amines with a high number of carbon atoms it is necessary to raise the temperature (to about 130° C. to about 150° C.) and perhaps to prolong the duration of the reaction; some amines, especially those of the aromatic series or those of a very high molecular weight, or esters of high molecular weight require heating under pressure at a temperature of about 100° C. to about 150° C. It may in certain cases be of advantage to work in the presence of a neutral solvent.

The ester-like compounds thus prepared which partly form crystals, partly have a honey- to fat-like consistency are soluble in neutral, acid or alkaline aqueous solutions. They are also highly stable to the action of salts that cause the hardness of the water as well as to other electrolytes which may by present.

By treating the ester-like products with saponifying agents there are obtained, with elimination of the respective alcohol, salt-like or soap-like bodies which, just as the products treated, are easily soluble in neutral, acid or alkaline aqueous solutions. Under suitable conditions, for instance, by warming with alkaline agents, such as baryta or BaCO₃, it is possible to substitute the OH-group for the halogen.

By treating the ester-like products with ammonia or organic primary or secondary bases or their substitution products such as, for instance, amino- or alkylamino-alkyl-sulfonic acids, amino-aryl-sulfonic acids, amino. carboxylic acids, especially their mixtures such as, for instance, the degradation products of albuminous substances, or their water-soluble salts, furthermore the hydroxyamines, halogenamines and the like, new products of amide-like nature are obtained which have exactly the same properties of solubility.

The following examples serve to illustrate the invention, but they are not intended to limit it thereto, the parts being by weight:

(1) 116 parts of tetramethyl-ethylene diamine are mixed with 216 parts of chloroacetic acid methylester whereby the temperature rises to about 130° C. After cooling, a tough water-soluble mass is formed. This mass is warmed for 3 hours at about 100° C. to about 120° C. with 80 parts of ethylene diamine of 100 per cent. strength or the corresponding quantity of an aqueous ethylene-diamine solution. After cooling, a clear resin-like glassy mass is obtained which dissolves in water to a clear solution.

(2) 160 parts of pentamethyl-diethylene-triamine are caused to react, while stirring and at a temperature of 100° C. to 110° C., with 370 parts of chloroacetic acid ethyl ester. The quarternary salt formed is soluble in water to a clear solution and forms a tough syrup-like mass.

520 parts of the quaternary salt thus obtained are heated, while stirring, at 120° C. to 125° C. together with 132 parts of symmetrical dimethyl-ethylene-diamine, until a test portion of the melt dissolves in water, although difficultly, to a clear solution. A nearly colorless, clear and very viscous mass is obtained.

(3) 116 parts of tetramethyl-ethylene-diamine are heated, while stirring, to 100° C. to 105° C. with 216 parts of chloroacetic acid methyl ester, until the mass dissolves in water to a clear solution.

332 parts of the dimethyl ester thus obtained are mixed with 102 parts of symmetrical dimethylpropylene-diamine-1.3. The polyamide is formed, evolution of heat occurring. In order to complete the reaction, the mass is further heated, for about 2 to 4 hours, to 120° C. to 125° C. The methyl alcohol set free is removed by a treatment under reduced pressure.

We claim:

1. The process which comprises treating an organic basic compound having at least two tertiary nitrogen atoms with an ester of a carboxylic acid containing a reactive anion.

2. The process which comprises treating an organic basic compound having at least two tertiary nitrogen atoms with an ester of an aliphatic carboxylic acid containing an anion of the group consisting of halogen and —OSO₂OH.

3. The process which comprises treating an organic basic compound having at least two tertiary nitrogen atoms with an ester of an aliphatic carboxylic acid containing an anion of the group consisting of halogen and —OSO₂OH and treating the reaction product with a saponifying agent.

4. The process which comprises treating an organic basic compound having at least two tertiary nitrogen atoms with an ester of an aliphatic carboxylic acid containing an anion of the group consisting of halogen and —OSO₂OH and treating the reaction product with an amino compound having at least one hydrogen atom bound to a nitrogen atom.

5. The process which comprises treating an organic basic compound having at least two tertiary nitrogen atoms with an ester of an aliphatic carboxylic acid containing an anion of the group consisting of halogen and —OSO₂OH and treating the reaction product with an aliphatic amino compound having at least one hydrogen atom bound to a nitrogen atom.

6. The process which comprises treating an organic basic compound having at least two tertiary nitrogen atoms with an ester of an aliphatic carboxylic acid containing an anion of the group consisting of halogen and —OSO₂OH and treating the reaction product with an aliphatic amino compound having at least 2 nitrogen atoms and at least one hydrogen atom bound to a nitrogen atom.

7. The process which comprises treating an organic basic compound having at least two tertiary nitrogen atoms with an ester of an aliphatic halogen carboxylic acid.

8. The process which comprises treating an organic basic compound having at least two tertiary nitrogen atoms with a chloracetic acid ester.

9. The process which comprises treating an organic basic compound having at least two tertiary nitrogen atoms with a chloracetic acid methylester.

10. The process which comprises treating an organic basic compound having at least two tertiary nitrogen atoms with an ester of an aliphatic halogen carboxylic acid and treating the reaction product with an aliphatic amino compound having at least 2 nitrogen atoms and at least one hydrogen atom bound to a nitrogen atom.

11. The process which comprises treating an organic basic compound having at least two tertiary nitrogen atoms with a chloracetic acid ester and treating the reaction product with an aliphatic amino compound having at least 2 nitrogen atoms and at least one hydrogen atom bound to a nitrogen atom.

12. The process which comprises treating an organic basic compound having at least two tertiary nitrogen atoms with a chloracetic acid ester and treating the reaction product with ethylene diamine.

13. The process which comprises treating an organic basic compound having at least two tertiary nitrogen atoms with a chloracetic acid ester and treating the reaction product with symmetrical dimethylethylenediamine.

14. The process which comprises treating an organic basic compound having at least two tertiary nitrogen atoms with a chloracetic acid ester and treating the reaction product with symmetrical dimethylpropylenediamine-1.3.

15. The products which are obtainable by treating an organic basic compound having at least two tertiary nitrogen atoms with an ester of a carboxylic acid containing a reactive anion.

16. The products which are obtainable by treating an organic basic compound having at least two tertiary nitrogen atoms with an ester of an aliphatic carboxylic acid containing an anion of the group consisting of halogen and —OSO₂OH.

17. The products which are obtainable by treating an organic basic compound having at least two tertiary nitrogen atoms with an ester of an aliphatic carboxylic acid containing an anion of the group consisting of halogen and —OSO₂OH and treating the reaction product with an amino compound having at least one hydrogen atom bound to a nitrogen atom.

18. The products which are obtainable by treating an organic basic compound having at least two tertiary nitrogen atoms with an ester of an aliphatic carboxylic acid containing an anion of the group consisting of halogen and —OSO₂OH and treating the reaction product with an aliphatic amino compound having at least 2 nitrogen atoms and at least one hydrogen atom bound to a nitrogen atom.

19. The products which are obtainable by treating an organic basic compound having at least two tertiary nitrogen atoms with an ester of an aliphatic halogen carboxylic acid and treating the reaction product with an aliphatic amino compound having at least 2 nitrogen atoms and at least one hydrogen atom bound to a nitrogen atom.

20. The products which are obtainable by treating an organic basic compound having at least two tertiary nitrogen atoms with a chloracetic acid ester and treating the reaction product with an aliphatic amino compound having at least 2 nitrogen atoms and at least one hydrogen atom bound to a nitrogen atom.

21. The products which are obtainable by treating an organic basic compound having at least two tertiary nitrogen atoms with a chloracetic acid ester and treating the reaction product with ethylene diamine.

22. The products which are obtainable by treating an organic basic compound having at least two tertiary nitrogen atoms with a chloracetic acid ester and treating the reaction product with symmetrical dimethyl-ethylenediamine.

23. The products which are obtainable by treating an organic basic compound having at least two tertiary nitrogen atoms with a chloracetic acid ester and treating the reaction product with symmetrical dimethylpropylenediamine-1.3.

GERHARD BALLE.
KURT EISFELD.